Dec. 15, 1936.  E. G. APPLETON  2,064,140
FLUID-TIGHT CONNECTER FOR THREADLESS PIPES
Filed April 22, 1936
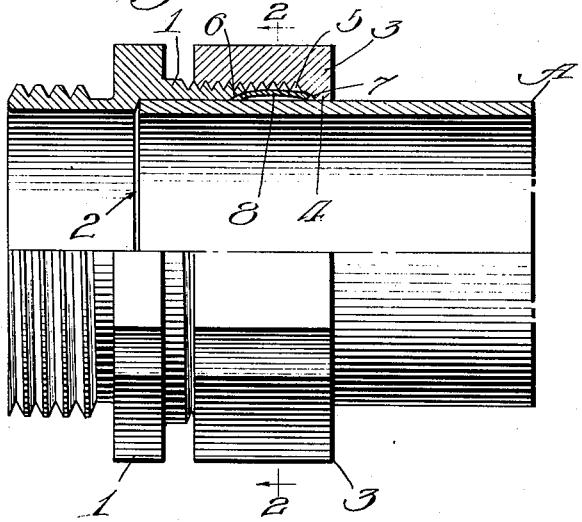
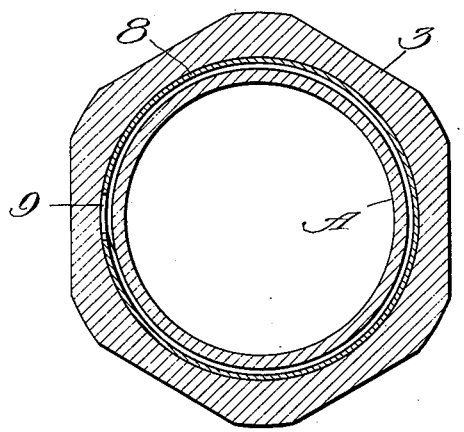
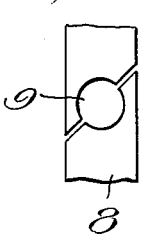
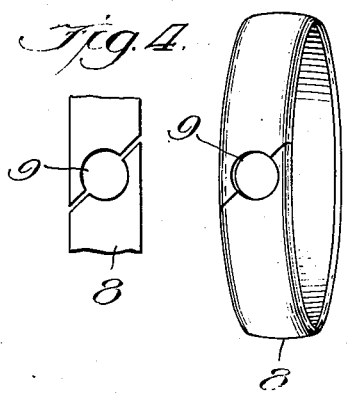
Inventor:
Ernst G. Appleton,
By Wm F. Freudenreich,
Atty.

Patented Dec. 15, 1936

2,064,140

UNITED STATES PATENT OFFICE 2,064,140

FLUID-TIGHT CONNECTER FOR THREADLESS PIPES

Ernst G. Appleton, Chicago, Ill., assignor to Appleton Electric Company, a corporation of Illinois Application April 22, 1936, Serial No. 75,678

4 Claims. (Cl. 285—123)

It is common to connect threadless pipes to other pipes or other elements by means of suitable couplings or connecters involving a contractile divided metal ring which surrounds and is forced into intimate contact with the pipe. While mechanical joints, that are sufficiently strong, may be made in this way, I know of no joint of this kind that has been water-tight. Thus, the usefulness of joints of this type has been limited to situations where it is not essential to guard against the passage or leakage of fluids.

The object of the present invention is to make it possible to secure a sealed joint through the use of a simple divided ring and the usual fittings for causing the ring to grip a pipe surrounded by the same.

In carrying out my invention, I employ a ring that is quite wide compared to the thickness of the metal. Thus, if the metal has a thickness somewhat less than but approaching about one thirty-secondth of an inch, it may be in the form of a band a quarter of an inch or more wide. This band is preferably curved transversely so as to form a shallow trough of which the concave side is on the interior of the ring. The ring is cut in two at one point in the usual way. In order that such a ring may effect a seal to prevent water or other fluids from traveling past the ring along a pipe which is being gripped by the latter, it is necessary that there be continuity of metal along some path extending entirely around the circumference of the ring; and that this path include an edge in contact with the pipe and a line or strip making contact with a continuous annular surface on a surrounding clamping element. This requires that the meeting ends of the ring be pressed tightly together at the same time that the ring tightly clamps the pipe. These conditions are attained by relieving the meeting edges of the band that forms the ring, so that these edges can engage each other only over short lengths adjacent to the end faces of the short cylinder constituting the ring. With this arrangement, it is not necessary to shape the ring with such great accuracy that the meeting ends engage each other with just the proper degree of pressure at the same time that what may be termed the long edges of the band are biting effectively into the surface of the pipe which is being held by the ring; but as long as the diameter of the ring be great enough, it can always be successfully contracted through a slight upsetting of the small abutments constituting the meeting ends of the band, so that after the ring itself has been closed so that it forms a seal between the meeting ends of the band, it may be further contracted so as also to effect the proper seal between the ring and the pipe.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a view partly in side elevation and partly in longitudinal section of a piece of pipe having applied thereto a connector or coupling embodying the present invention; Fig. 2 is a section on line 2—2 of Fig. 1; Fig. 3 is a perspective view of the clamping ring, shown closed as it appears in Figs. 1 and 2; and Fig. 4 is an elevation of a fragment of the ring, adjacent to the line of division, showing the ring ends separated from each other.

Referring to the drawing, A represents a threadless pipe adapted to be connected to a member in axial alignment therewith. In the arrangement shown, this member is a sleeve 1 having a bore into which the pipe may fit, and between its ends, an internal annular shoulder 2 against which the pipe may abut to limit its entrance into the sleeve. Loosely surrounding the pipe is a sleeve nut 3 adapted to be screw-threaded upon the member 1. One end of the bore in the nut is of reduced diameter so as to be an approximate fit for the pipe and, at the same time, provide an annular internal flange 4. As is customary, the parts are so proportioned that when the nut is screwed upon the sleeve an annular chamber 5 is formed around the pipe; the end of the member 1 bounding the chamber at one side and the flange 4 bounding it at the other side. The edge of the member 1 and the inner face of the flange 4 are given frusto-conical shapes, as indicated at 6 and 7.

In the chamber 5 is a clamping ring 8 in the form of a thin, wide metal band which is curved transversely so as to form a shallow trough; the concave side of the band being on the inner side of the ring, so that when the ring is placed about the pipe and is contracted, the long edges of the band make contact with the pipe along two circumferential lines spaced apart from each other lengthwise of the pipe. The length of the ring, that is the dimension corresponding to the width of the band, is such that its two ends engage with the frusto-conical faces 6 and 7 when the parts of the connecter are assembled relatively to the pipe; whereby a tightening of the nut causes the ring to be contracted and forced into intimate contact with the pipe.

In order that the ring may provide a seal past which water or other fluids cannot pass, the ends of the ring shaped band must fit against each other so accurately that the effect is the same as though the ring were continuous instead of being divided. It has heretofore been impracticable to do this while, at the same time, pressing the long edges of the band against the pipe in such a manner as to provide a seal between each edge of the ring and the pipe. In accordance with my invention, I so shape the meeting edges of the ring-shaped band that only a small part of each face engages with the opposed edge face. Therefore, when heavy pressure is applied through the screwing up of the nut, the metal adjacent to the line of division of the ring may readily be upset or swaged sufficiently to permit a slight further contraction of the ring, and the effective gripping of the pipe by the latter. In other words, the cross sectional area of the metal which is available to resist compression in the circumferential direction adjacent to the dividing line in the ring is much smaller than at any other point in the ring, and deformation of the ring will therefore occur at that point instead of elsewhere. In the arrangement shown, I simply punch or drill a comparatively large hole 9 through the ring across the line of division in the latter. The meeting ends of the ring-like band therefore cannot touch each other except in the regions lying outwardly from the hole.

It will thus be seen that by making the ring large enough, so that the meeting edges thereof will come in contact at about the time that the gripping edges touch the pipe, further contraction of the ring may be brought about to tighten the ring about the pipe to any desired degree; the only effect on the ring itself of this further contraction being to compress or upset the weakened meeting sections of the ring and the provision of a more intimate fit of such meeting sections against each other. The size of the hole cut through the ring or, the width of the relieved areas of the edge faces may be as great as desired, as long as it does not extend to the lines of contact between the ring and the frusto-conical faces 6 and 7 on the members 1 and 3; for it is essential that after the connection has been tightened there be a continuous line of contact between each of the faces 6 and 7 and the ring as well as between the gripping edges of the ring and the pipe. Thus, no fluids can escape between the ring and the pipe or between the ring and either of the surrounding frusto-conical faces on the clamping members, or through the joint in the ring itself in the regions where this joint may be said to be exposed between an inner seal at the surface of the pipe and an outer seal between the ring and one of the surrounding clamping members.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A clamping ring comprising a wide, thin band formed into a ring and having its end faces relieved at the middle and adapted to fit against each other adjacent to the long edges of the band.

2. A clamping ring comprising a wide, thin band formed into a ring and having its ends cut diagonally to the length of the band, the end faces of the band being relieved at the middle and being adapted to fit against each other adjacent to the long edges of the band.

3. A clamping ring comprising a wide, thin band formed into a ring and having its ends cut diagonally to the length of the band, the end faces of the band being relieved at the middle and being adapted to fit against each other adjacent to the long edges of the band, and said band being in the form of a shallow trough the concave side of which is on the inner side of the ring.

4. A clamping ring comprising a wide, thin band formed into a ring having its end faces relieved so as to allow only small sections thereof adjacent to the ends or edges of the ring to be in actual engagement with each other, and said band being in the form of a shallow trough the concave side of which is on the inner side of the ring.

ERNST G. APPLETON.